(12) United States Patent
Hashemi

(10) Patent No.: US 6,845,465 B2
(45) Date of Patent: Jan. 18, 2005

(54) METHOD AND SYSTEM FOR LEVERAGING SPARES IN A DATA STORAGE SYSTEM INCLUDING A PLURALITY OF DISK DRIVES

(75) Inventor: Ebrahim Hashemi, Los Gatos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 524 days.

(21) Appl. No.: 09/955,527

(22) Filed: Sep. 17, 2001

(65) Prior Publication Data

US 2003/0056142 A1 Mar. 20, 2003

(51) Int. Cl.[7] .............................................. G06F 11/00
(52) U.S. Cl. ........................... 714/6; 714/42; 711/112; 711/114
(58) Field of Search ........................... 714/6, 7, 8, 42; 711/112, 114

(56) References Cited

U.S. PATENT DOCUMENTS

| | | | | |
|---|---|---|---|---|
| 5,499,253 A | * | 3/1996 | Lary ........................... | 714/770 |
| 5,651,133 A | * | 7/1997 | Burkes et al. ............... | 711/114 |
| 5,666,512 A | * | 9/1997 | Nelson et al. ............... | 711/114 |
| 5,708,668 A | * | 1/1998 | Styczinski ..................... | 714/6 |
| 6,079,029 A | * | 6/2000 | Iwatani et al. ................. | 714/6 |
| 6,154,853 A | * | 11/2000 | Kedem ........................... | 714/6 |
| 6,530,035 B1 | * | 3/2003 | Bridge ........................... | 714/6 |
| 6,557,123 B1 | * | 4/2003 | Wiencko, et al. ............ | 714/701 |

OTHER PUBLICATIONS

David A Patterson, Garth Gibson, and Randy H. Katz; A Case for Redundant Arrays of Inexpensive Disks (RAID); 1988; University of Berkeley, California.

* cited by examiner

*Primary Examiner*—Robert Beausoliel
*Assistant Examiner*—Emerson Puente
(74) *Attorney, Agent, or Firm*—Robert C. Kowert; Meyertons, Hood, Kivlin, Kowert & Goetzel, P.C.

(57) ABSTRACT

A method and apparatus for leveraging spare disks in a data storage system. Specifically the present invention describes a method for data recovery and redundancy in a data storage system having a plurality of disk drives. The data storage system is grouped into a plurality of arrays having data redundancy. The plurality of arrays is arranged in an optimum combination of arrays of mirrored pairs of disk drives, arrays of three disk drives in a redundant array of independent disks (RAID) configuration, and arrays of more than three disk drives in a RAID configuration to maximize performance while providing data redundancy. For every failure of one of said plurality of arrays due to a failed disk drive, a new array having data redundancy in a RAID configuration is dynamically created in said plurality of arrays. The new array is optimized for best performance and contains information from the failed disk drive.

38 Claims, 10 Drawing Sheets

US 6,845,465 B2

METHOD AND SYSTEM FOR LEVERAGING SPARES IN A DATA STORAGE SYSTEM INCLUDING A PLURALITY OF DISK DRIVES

BACKGROUND OF THE INVENTION

1. Field of the Invention

Embodiments of the present invention relate to the field of data storage systems. More particularly, embodiments of the present invention relate generally to the leveraging of spare disks in a data storage system to provide redundant storage and the reconstruction of data in multiple arrays of disk drives after failure of a disk drive.

2. Related Art

Secondary data storage is an integral part of large data processing systems. A typical data storage system in the past utilized a single, expensive magnetic disk for storing large amounts of data. This single disk in general is accessed by the Central Processing Unit (CPU) through a separate Direct Memory Access (DMA) controller. The DMA controller then translates and executes the Input/Output (I/O) requests of the CPU. For single disk memory storage systems, the speed of data transfer to and from the single, large disk is much slower than the processing speed of the CPU and acts as a data processing bottleneck.

In response, redundant arrays of independent disks (RAIDs) have evolved from the single disk storage systems in order to match the speed of secondary storage access with the increasingly faster processing speeds of the CPU. To increase system throughput, the RAID architecture of secondary storage allows for the concurrent access of data from multiple disk drives.

The concept for the RAID architecture was first formalized in an article written by some members of the Department of Electrical Engineering and Computer Sciences at the University of California at Berkeley, entitled: "A Case for Redundant Arrays of Inexpensive Disks (RAID)," by D. A. Patterson, G. Gibson, and R. H. Katz, ACM SIGMOD Conference, Chicago, Ill., June 1988, hereinafter referred to as "Patterson et al."

Typically, RAID architectures consist of one or more host interface controllers connected to several peripheral interface controllers via a high speed data bus. Each peripheral interface controller is, in turn, connected to several individual disk drives which provide the secondary storage for the connected hosts. Peripheral interface controllers, also referred to as array controllers herein, can be connected to the disk drives via common communication interfaces (e.g., SCSI). Generally, the speed of the data bus is greater than the speed of the interface between the disk drives and the peripheral interface controllers.

In order to reconstruct lost data in a redundancy group due to a failed disk, the system must define a reversible mapping from the data and its redundancy data in the group containing the lost data. Patterson et al. describe in their paper several such mappings. One such mapping is the RAID level 4 (RAID-4) mapping that defines a group as an arbitrary number of disk drives containing data and a single redundancy disk. The redundancy disk is a separate disk apart from the data disks.

Another mapping, RAID level 5 (RAID-5) distributes the redundancy data across all the disks in the redundancy group. As such, there is no single or separately dedicated parity disk. As the number of disks in a RAID-5 array increases, the potential for increasing the number of overlapped operations also increases. RAID-5 arrays can support more disks than a RAID-4 array which allows a RAID-5 array to achieve higher data storage capacity and higher number of disks for better performance.

Some RAID storage systems contain spare disk drives. Storage units with additional spare disks are designed to operate continuously over a specified period of time, without requiring any repair of the unit due to failed disks. This is accomplished by carefully identifying and quantifying the components that are expected to fail during a given time period, and incorporating within the system sufficient hot-spare parts or disks. This internal spare disk architecture can automatically switch to the spare disks when a failure is encountered. Spares are incorporated so that compatible disk devices are always at hand upon a disk failure.

Prior Art FIG. 1 depicts a common implementation of a data storage system 100 containing spare disks. The data storage system is arranged in a RAID 5 configuration 110–150 with three spares 162–166. In the data storage system 100, a data volume is divided into segments (e.g., 64 KB) called stripe units. Stripe units are mapped consecutively on a set of physical devices for parallel access purposes.

In order to recover from physical device failures (e.g., a disk) functions generating redundancies of a group of stripe units are generated and mapped to distinct physical devices. Normally, each member of the group has to be mapped to a different physical device in order to make the recovery possible. The set of functions form a set of equations with a unique solution. A single even parity function is commonly used and can recover from any single device failure in the group.

For example, data storage system 100 contains eight disks. Five of the disks (e.g., disks 110, 120, 130, 140, and 150 contain data and their redundancies). The remaining three disks (e.g., disks 162, 164, and 166) are spare disks.

Further, in the RAID-5 configuration, system 100 stripes its data across groups of data stripe units. In the redundancy group of stripe unit-0, disk 110 contains data block-0, disk 120 contains data block-1, disk 130 contains data block-2, and disk 140 contains data block-3. Disk 150 in stripe unit-0 contains the redundancy data for blocks 0–3.

In the RAID-5 configuration, system 100 puts the redundancy data for the next redundancy group associated with stripe unit-1 on disk 140 rather than on disk 150 for the redundancy group.

The disadvantage of the configuration illustrated in system 100 is the relatively large number of accesses required for performing a partial rewrite of the data in the redundancy group of stripe units. This drawback is specially noticeable in smaller RAID data storage systems. In a write operation, if the entire data involved in a redundancy group is to be written (e.g., a full stripe write), then the redundancy can be readily generated. However, in many cases, a write operation involves only part of the data involved in the group with the remainder data remaining the same.

Depending on the size of the data to be updated, one of the following two schemes can be used to perform a partial rewrite. In the first scheme, the remaining data in the group is read from the devices to help generate the required redundancies in conjunction with the new data to be written. This scheme is referred as "reconstruct write" scheme. This still requires accessing the entire group of stripe units to generate the new redundancies, and generally provides no additional efficiency benefits.

In the second scheme, the old data corresponding to the new data to be written is read along with the old redundancy to help generate the new redundancy in conjunction with the data to be written. This scheme is referred as "read-modify-write" scheme. This scheme is based on the fact that the functions used are generally idempotent binary operations (e.g., the exclusive OR function: XOR).

The second scheme is efficient for "small writes" and is commonly used. However, for a RAID system with "r" redundancies, it requires 2(r+d) accesses to the disk drives, where "d" is the number of data disks involved in the small write. For instance, "r" accesses to read the old redundancies, "d" accesses to read the old data, "d" accesses to write the new data, and "r" accesses to write the new redundancies. For example, the commonly used one redundancy scheme requires four accesses for every partial write, if the data to be written fits entirely on one disk. For larger data storage systems, each additional access reduces throughput and the operating efficiency of the entire system.

Throughput is affected even more greatly in a system with two redundancy schemes. For example, the less frequently implemented P+Q (r=2) scheme requires an even greater number of accesses (e.g., six accesses per partial write). This is a barrier for the consideration of the more fault-resilient schemes with greater than one redundancy.

Still another disadvantage is the inherent performance degradation within a RAID-5 system. As the number of disks in the array increases, the mean time to data loss (MTDL) is shorter in a RAID-5 system due to the higher probability that a second disk or a block of data on a disk will fail before a failed disk is repaired, even despite the number of spare disks available.

SUMMARY OF THE INVENTION

Embodiments of the present invention disclose a method and system for leveraging spare disks for data redundancy in response to failure in a data storage system. One embodiment of the present invention increases the efficiency of data storage systems. Additionally, another embodiment of the present invention reduces the access time for updating the redundancy function on a partial update of data and/or disk failure. Still another embodiment reduces the performance degradation of the data storage system due to device failure.

Specifically, one embodiment of the present invention describes a method for providing data redundancy in a data storage system having a plurality of disk drives with spare disks. The data storage system is grouped into a plurality of arrays having data redundancy. The method reduces the access time for updating the redundancy function on the partial update of the data on a RAID system with sufficient spares. The method utilizes the spare devices to configure a RAID device as a federation of smaller RAID devices. This method enhances the performance of the system generally for small input/output (I/O) operations. For large I/O operations, the performance of a RAID system configured according to this embodiment is better than or equal to commonly known configurations. Also, this embodiment generally enhances the availability of such systems. In addition, this embodiment generally reduces the performance degradation due to device failures.

In one embodiment, the plurality of arrays are arranged to maximize the number of arrays that are mirrored pairs of disk drives. In another embodiment, the plurality of arrays are arranged in an optimum combination of arrays of mirrored pairs of disk drives, arrays of three disk drives in a redundant array of independent disks (RAID) configuration, and arrays of more than three disk drives in a RAID configuration. The optimum combination maximizes performance while providing data redundancy.

For every failure of one of said plurality of arrays due to a failed disk drive, a new array having data redundancy in a RAID configuration is created in the plurality of arrays. The new array is created by combining the operable disk drives in the failed array, not including the failed disk drive, with disk drives from a second array in the plurality of arrays. The second array is chosen by selecting the array in the plurality of arrays with the smallest number of disk drives. As such, the new array is also optimized for the best performance while providing data redundancy. The newly created array recovers and includes information from the failed disk drive.

In one embodiment, a data storage system is comprised of eight disks including three spares. Initially, system is configured into four arrays of mirrored pairs. Upon a first disk failure in a failed array, a RAID-4 or RAID 5 array of three disks is created between the failed array and another array. The new array contains two data disks and one redundancy disk (2+1 RAID-4/5 array). The remaining two mirrored pairs are untouched. If another failure occurs in the remaining two mirrored pairs, then a second RAID-4 or RAID-5 device of three disks is similarly created.

However, if a second failure occurs in the 2+1 RAID-4/5 array, then another RAID-4/5 device of four disks is created between the failed 2+1 RAID-4/5 array and one of the remaining arrays of two mirrored pairs. This new array contains three data disks and one redundancy disk (3+1 RAID-4/5 array). The remaining mirrored pair is untouched.

Upon a failure in the 3+1 RAID 4/5 array, a third failure, then another RAID-4/5 device of five disks is created between the failed 3+1 RAID-4/5 array and the remaining mirrored pair array. This new array contains four data disks and one redundancy disk (4+1 RAID 4/5 array).

BRIEF DESCRIPTION OF THE DRAWINGS

PRIOR ART

DETAILED DESCRIPTION OF THE INVENTION

Figure 1:
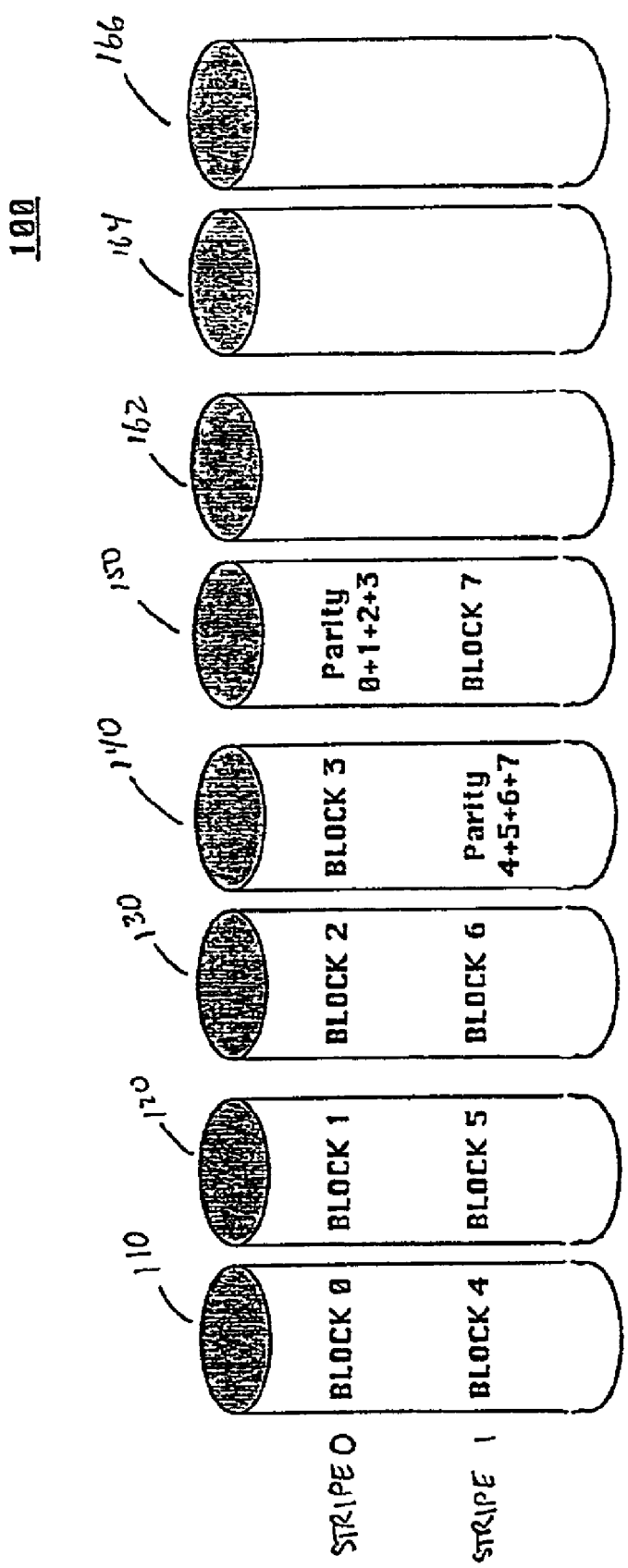
FIG. 1 is a block diagram of a data storage system in a redundant array of independent disks (RAID) level 5 configuration with additional spare disks.

Reference will now be made in detail to the preferred embodiments of the present invention, a method and system for leveraging spare disks to provide recovery and redundancy after disk failure, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "processing," "computing," "translating," "calculating," "determining," "scrolling," "displaying," "recognizing," or the like, refer to the action and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Figure 2:
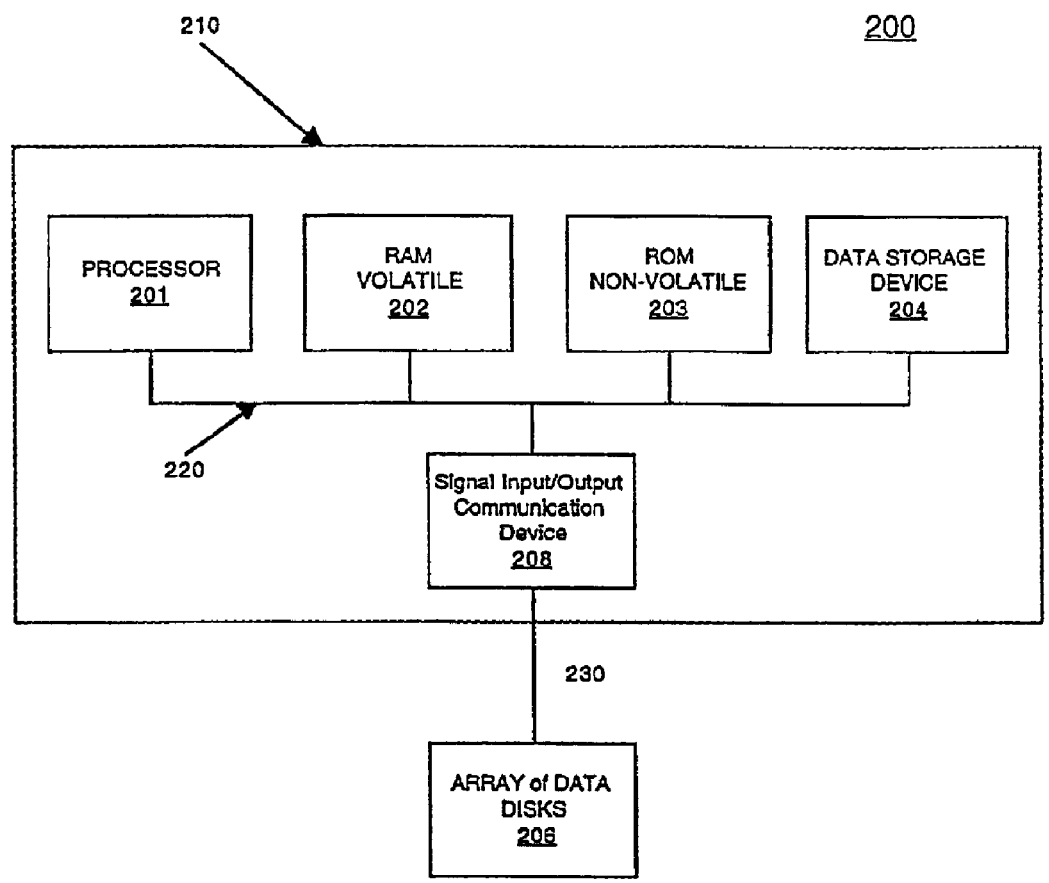
FIG. 2 is a logical block diagram of an exemplary array controller, in accordance with an embodiment of the present invention.

Referring to FIG. 2, embodiments of the present invention are comprised of computer-readable and computer-executable instructions which reside, for example, in computer-readable media of an electronic system, such as an array controller. FIG. 2 is a block diagram of exemplary embedded components of an array controller 210 upon which embodiments of the present invention may be implemented. Exemplary array controller 210 includes an internal address/data bus 220 for communicating information, a central processor 201 coupled with the bus 220 for processing information and instructions, a volatile memory 202 (e.g., random access memory (RAM), static RAM dynamic RAM, etc.) coupled with the bus 220 for storing information and instructions for the central processor 201, and a non-volatile memory 203 (e.g., read only memory (ROM), programmable ROM, flash memory, EPROM, EEPROM, etc.) coupled to the bus 220 for storing static information and instructions for the processor 201.

With reference still to FIG. 2, an optional signal Input/Output (I/O) device 208 is shown. The I/O device 208 is coupled to bus 220 for providing a communication link between array controller 210 and an array network of data storage devices, such as disks. As such, signal I/O device 208 enables the central processor unit 201 to communicate with or monitor other electronic systems blocks that are coupled to the array controller 210.

The input/output device 208 could be a I/O interface such as a serial or USB port that is associated with the bus 220. Data from the array controller 210 travels through the port and onto an external bus 230 that provides for data transfer between components of the data storage system 200, including between array controller 210 and an array of disk drives 206.

Centralizing a Certificate Revocation List in a Certificate Authority Cluster

This disclosure describes a method and apparatus for leveraging spare disks for providing recovery and data redundancy upon disk failure in a data storage system. Also, one embodiment of the present invention increases the efficiency of data storage systems. Additionally, another embodiment of the present invention reduces the access time for updating the redundancy function on a partial update of data and/or disk failure. Still another embodiment reduces the performance degradation of the data storage system due to device failure.

Embodiments of the present invention describe data storage units which include adequate amounts of spare disk drives. However, it is appreciated that embodiments of the present invention can also optimize a data storage system with limited or no spare disks, especially upon failure of a disk drive.

Figure 3:
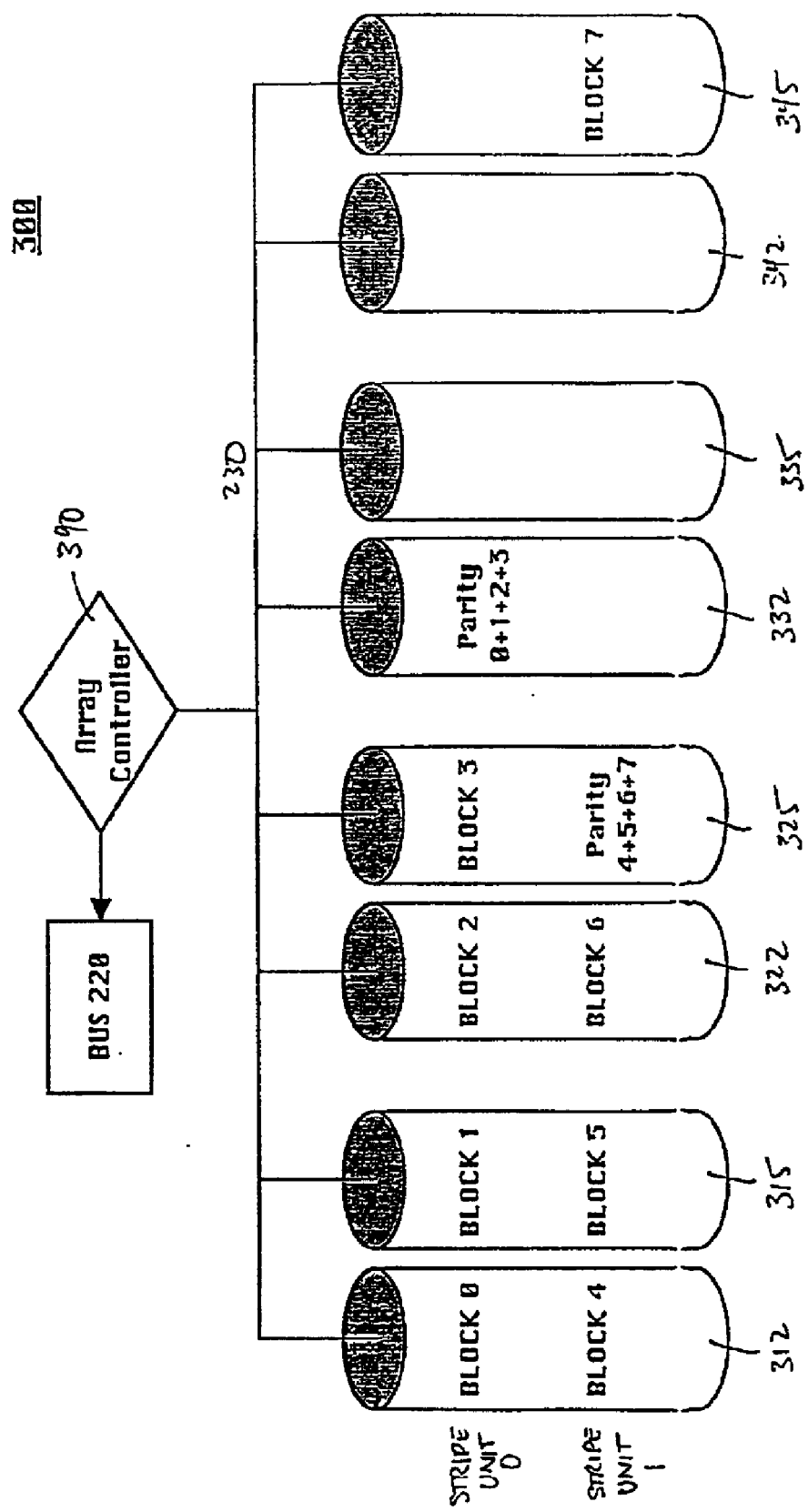
FIG. 3 illustrates a block diagram of an exemplary data storage system in a RAID-5 configuration, in accordance with one embodiment of the present invention.

The data storage system 300, as depicted in FIG. 3, includes space for three additional devices, or disk drives, which act as spares. Commonly, small RAID systems, such as system 300, will include at most a single hot spare. However the amount of spares included within a system (e.g., system 300) is dependent on factors, such as, total cost of ownership and quality of service. There is an additional service cost associated with providing inventory and servicing of spare devices as device failures happen. Also, making the spare disk drives "hot replaceable" adds to the cost of the RAID devices. Thus, depending on design needs, a data storage system 300 will embed enough spare disks inside the RAID system 300 to ensure a very low probability that the data storage system 300 will run out of hot spare before its end of life, as requested by the customer.

FIG. 3 also shows an array controller 390 coupled between the storage bus 220 of FIG. 2 and the disk drives (disks 312, 315, 322, 325, 332, 335, 342, and 345) in a parallel access array. The array controller 390 is coupled to each of the disk drives in FIG. 3 via external bus 230. The array controller 390 presents one or more virtual arrays of disk drives to the host system and distributes the I/O operations to the corresponding member disks. The array controller 390 is also responsible for maintaining the mapping between the virtual device and the individual disk drives in the array. The array controller basically provides device virtualization, coordinates writing to member disks, and maintains the mapping from the virtual device to the member disks. The array controller 390 can also be used for independent access arrays in another embodiment.

In one embodiment of the present invention, one solution to the write performance problem described earlier, especially in smaller data storage systems, is to utilize the spare disks in an optimal RAID configuration of the data storage system 300 for increased performance. A well-known technique is to stripe the spares across the physical devices. Spare striping is illustrated in FIG. 3. This illustration is exemplary only as different granularities of striping and skewing can be applied.

In FIG. 3, data and its redundancy is striped across the various disks in the system 300. In the redundancy group of stripe unit-0, disk 312 contains data block-0, disk 315 contains data block-1, disk 322 contains data block-2, and disk 325 contains data block-3. Disk 332 in stripe unit-0 contains the redundancy data for data blocks 0–3.

In the RAID-5 configuration, system 300 puts the redundancy data for the next redundancy group associated with stripe unit-1 on disk 325 rather than on disk 332 for the previously mentioned redundancy group. In addition, data block-7 is skewed and placed on disk 345, which is normally a spare disk.

However, striping and skewing the data and data redundancy results only in minimal performance enhancements. Mainly, more of the data, its redundancies, and operations on the data is uniformly spread throughout the disks in the data storage system 300, to include the spare disks. However, no improvement is gained in write performance for a data storage system with a RAID-4/5 configuration.

The method outlined in flow charts 700, 750 and 800 in combination with FIGS. 3, 4, 5, and 6 provide for efficient partial writes and dynamic reconfiguration recovery from disk failure in a data storage system that leverages spare disks for data redundancy. In one embodiment of the present invention, the methods described in flow charts 700, 750 and 800 utilizes the spare disks to enhance the read and write performance of the data storage system 300. Also, the present embodiment enhances data availability in data storage system 300.

Figure 7A:
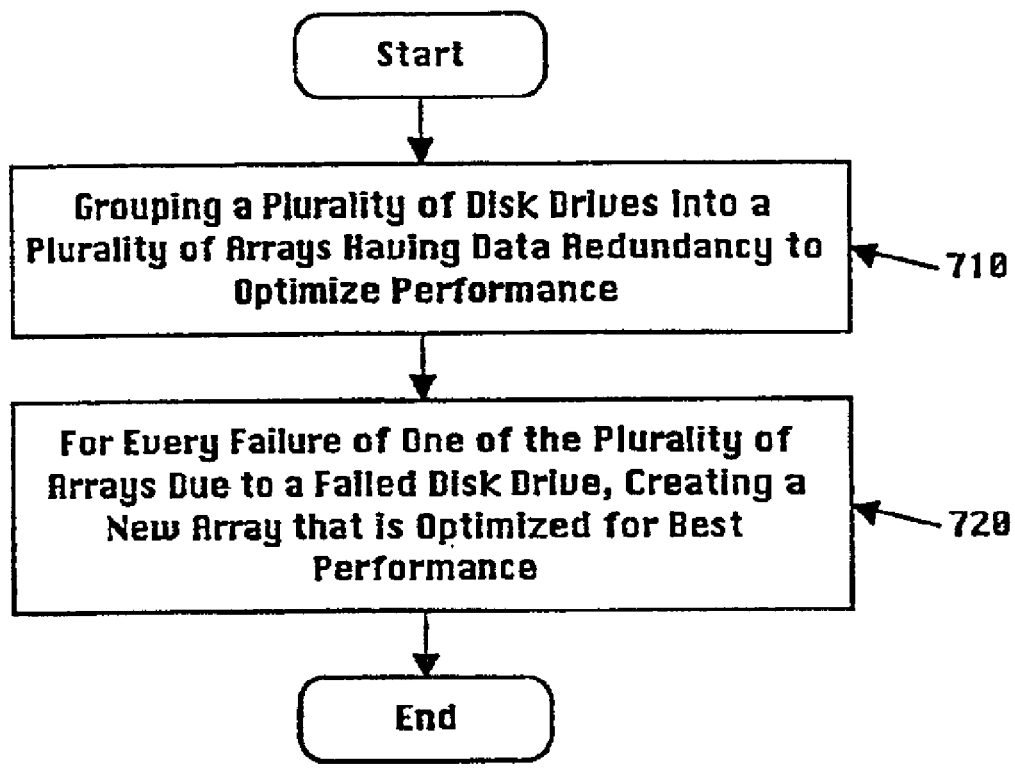
FIG. 7A is a flow diagram illustrating steps in a computer implemented method for leveraging spare disks to provide data redundancy after disk failure, in accordance with an embodiment of the present invention.

FIG. 7A is a flow diagram illustrating steps in a computer implemented method for providing data redundancy in a data storage system, in accordance with one embodiment of the present invention, including dynamic reconfiguration in response to device failures. In step 710, the present embodiment groups a plurality of disk drives into a plurality of smaller arrays or groups with data redundancy. This grouping is to enhance the performance of the data storage system 300.

The present embodiment utilizes the spare disks to configure the overall data storage system into smaller and more fault-resilient arrays of RAID-0 configurations. A data storage system with a RAID-0 configuration is simply disk striping without parity redundancy. Instead, backup of data is provided by mirrored copies, in one embodiment of the present invention.

Figure 4:
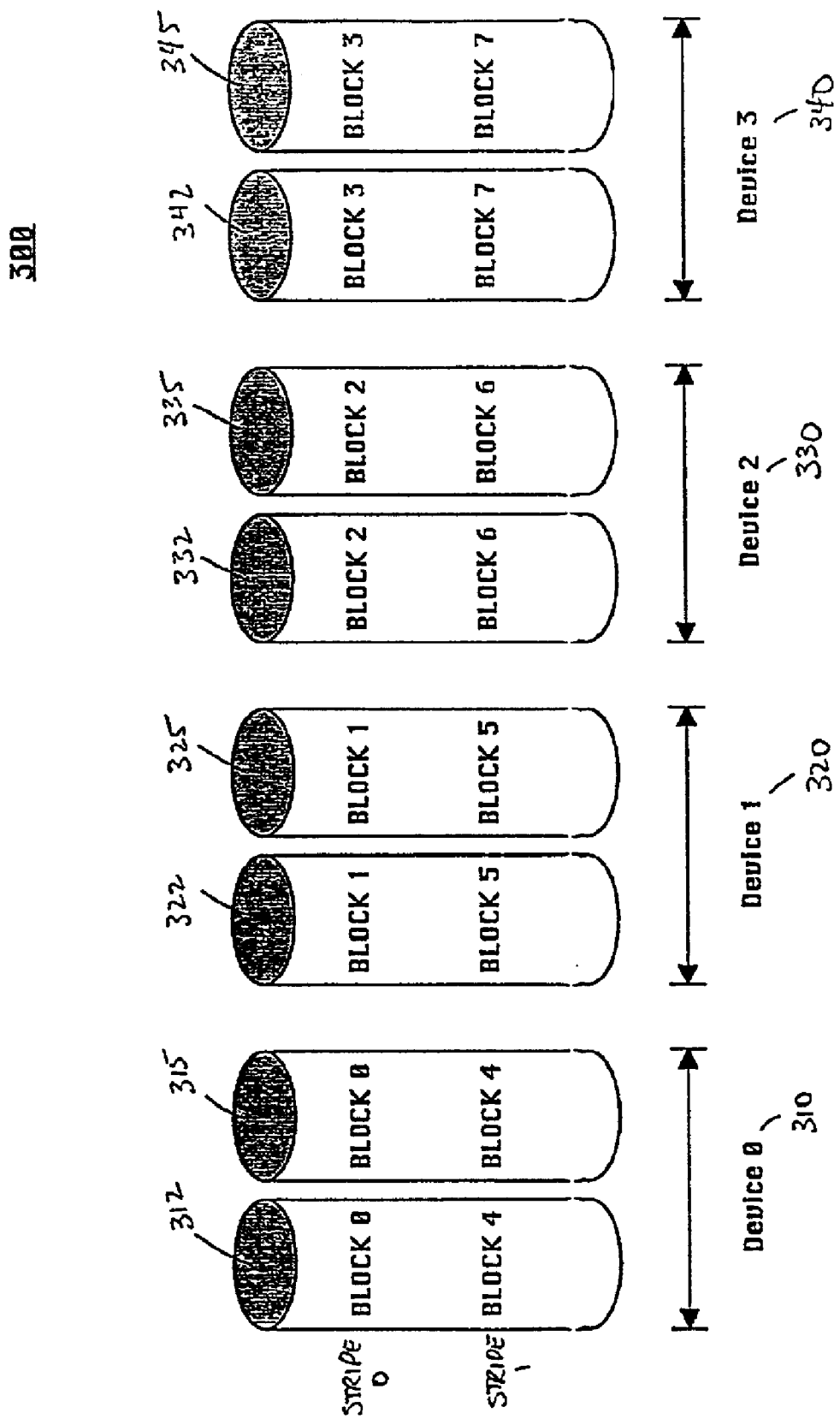
FIG. 4 illustrates a block diagram of the exemplary data storage system of FIG. 3 with mirrored redundancy, in accordance with one embodiment of the present invention.
Figure 8:
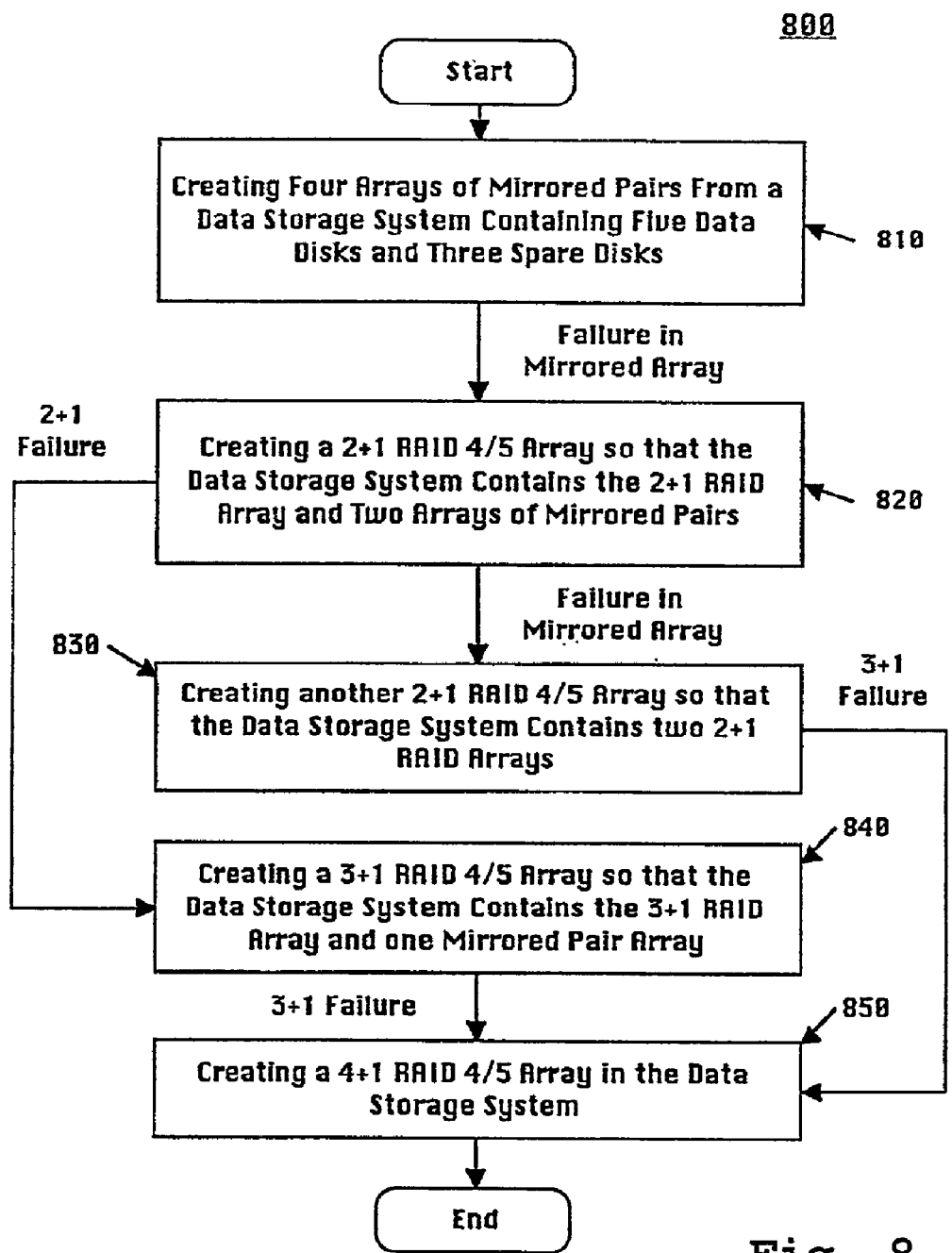
FIG. 8 is a flow diagram illustrating steps in a computer implemented method for recovering from disk drive failure in an array of eight disks including three spare disks, in accordance with an embodiment of the present invention.

FIG. 4, in combination with FIG. 8, illustrates one possible RAID-0 configuration in accordance with steps 710 and 810 for the data storage system 300 with sufficient spare disks. FIG. 8 is a flow diagram of one implementation of the method outlined in FIG. 7A for the data storage system 300, in accordance with one embodiment of the present invention. Data storage system initially contains eight disks where five disks contain data and three disks are spares.

For the present embodiment, in step 810, system 300, as illustrated in FIG. 4, is partitioned into four devices the identified smaller arrays: device-0 310 consists of disks 312 and 315, device-1 320 consists of disks 322 and 325, device-2 330 consists of disks 332 and 335, and device-3 340 consists of disks 342 and 345. Each device contains mirrored copies of data, or mirrored pairs. For example, in device-0 310, disk 312 contains data block-0 and data block-4. The mirrored disk, disk 315, contains the same information: data block-0 and data block-4 in the same stripe unit locations.

Without the overhead of calculating parity, these smaller arrays in a RAID-0 configuration provide the fastest throughput of any type of array. As such, the write performance is greatly improved. Any write of a block (which is assumed to be equal to stripe unit for simplicity) or less can be achieved with two accesses since r accesses are required for each write to an r-copy mirrored disk. On the other hand, a RAID-4/5 configuration in FIG. 3 cannot achieve the same result in less than four accesses, or half the throughput of the mirrored system.

In addition, for read optimization purposes, any block can be singly accessed from at least two drives. A round robin scheduling can load balance between two copies of data, while in the RAID-4/5 configuration in FIG. 3 two blocks of information on the same drive cannot be read with less than two accesses. As such, the probability of data loss in this RAID-0 configuration of FIG. 4 is about one-fifth that of the RAID-4/5 configuration in FIG. 3.

While the present embodiment describes a data storage system with sufficient spare disks, other embodiments include configurations that maximize the number of mirrored pairs of data disk drives. Still other embodiments maximize the number of arrays in the plurality of smaller arrays that are in a RAID configuration with three data disk drives having redundancy. In this configuration, improved write performance is still maintained over an exclusively RAID-4/5 configuration in system 300.

For example, a twenty disk drive system contains sixteen disk drives containing data and four spare disk drives. In a RAID-4/5 configuration, the distribution of one redundancy and three spares can be equally divided into four arrays, where each array contains four disk drives containing data and one disk drive containing redundancy data. While this RAID-4/5 configuration is beneficial for degraded performance after disk failure, it is not generally helpful for improved small write performance.

Instead, a more robust configuration tries to maximize the number of arrays with three disk drives. As such, a more robust configuration is one where three arrays contain the three disk drives, where each array contains two disk drives containing data and one disk drive for redundancy data. A fourth array is comprised of ten disk drives containing data and one disk drive containing the corresponding redundancy data. Still, this configuration requires only three accesses per partial write on the first three arrays and four accesses per partial write on the fourth array.

Referring back to FIG. 7A, the embodiment implements step 720 of flow chart 700 upon failure of a disk drive in one of the smaller arrays. In step 720, for every failure of one of the plurality of smaller arrays in system 300, the present embodiment dynamically creates a new array that is optimized for best performance. The new array contains the same information that was lost in the failed disk drive containing data. A failure in one of the smaller arrays is considered as a reduction in the number of spares in the data storage system 300. Essentially, the present embodiment may migrate two smaller RAID arrays into a single bigger fault-resilient array, the new array, that has lesser redundancy.

Figure 7B:
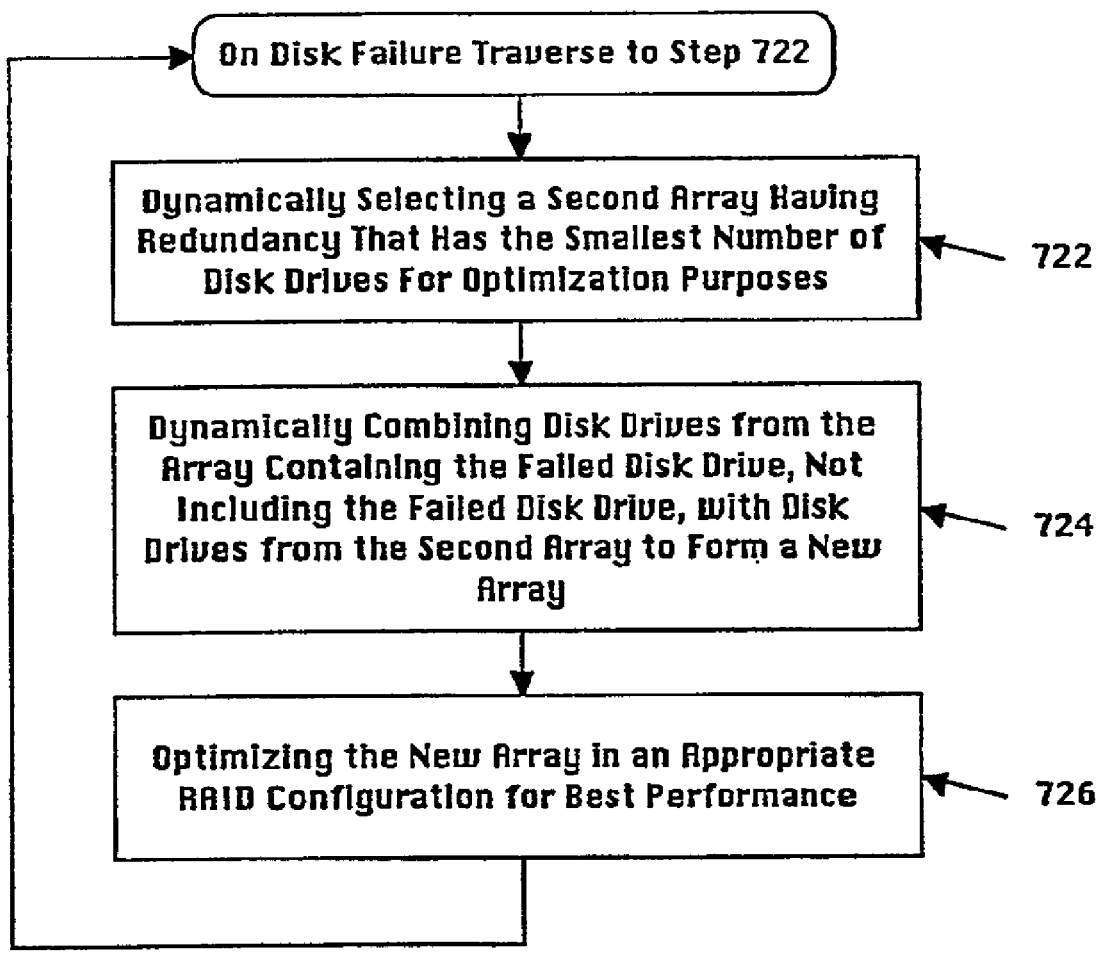
FIG. 7B is a flow diagram illustrating steps in a computer implemented method for recovering from disk drive failure in an array by migrating disks from two arrays, in accordance with an embodiment of the present invention.

FIG. 7B is a flow diagram 750 expanding on step 720 in FIG. 7A, illustrating steps in a computer implemented method for creating a new array after disk failure in a data storage system (e.g., system 300), in accordance with one embodiment of the present invention. For every disk failure, the present embodiment, in step 722, dynamically selects a second array having redundancy in the plurality of smaller arrays of system 300 that has the smallest number of disk drives. In a data storage system with sufficient spares in a RAID-0 mirrored configuration, the array selected is a mirrored pair of disk drives. Step 722 is performed upon failure of a smaller array due to a failure of a disk drive.

In step 724, the present embodiment dynamically combines disk drives from the array that contains the failed disk drive with disk drives from the second array to dynamically form a new array. The new array does not include the failed disk drive. The new array includes information from the failed disk drive that is reconstructed, and has data redundancy. The new array is initially optimized for better performance since it contains the minimum number of disk drives. In a case where the second array is a mirrored array, the new array would contain three disk drives, two containing data and one containing the redundancy data. For instance, a RAID-4 or RAID 5 array can be implemented with two data disks and one redundancy disk (2+1 RAID device). The remaining disk drives can still use the mirrored RAID-0 approach. This still provides an optimum partial write operation that requires only three accesses for the RAID-4/5 arrays and only two accesses for the mirrored arrays.

In step 726, the present embodiment dynamically optimizes the new array into an appropriate RAID configuration, in one embodiment of the present invention. This new array is optimized for best performance of the data storage system 300. In one embodiment, as previously discussed, the optimum configuration for the new array in the data storage system 300 is a RAID-4 configuration. This may be the case where the data storage system 300 simultaneously processes multiple I/O read requests. In another embodiment, the optimum configuration for the new array in the data storage system 300 is a RAID-5 configuration. A RAID-5 configuration optimizes the data storage system 300 for better write I/O operations.

Figure 5A:
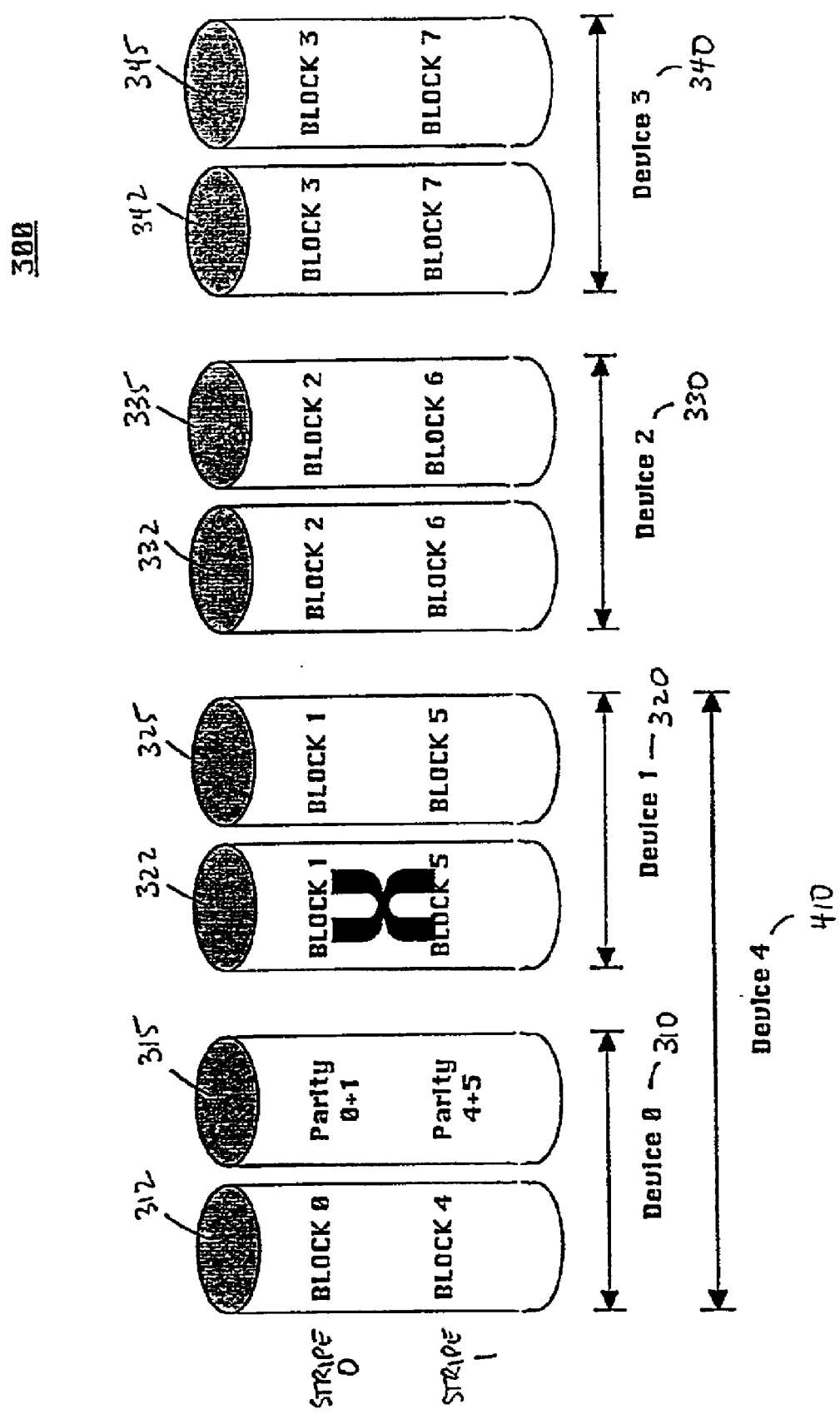
FIG. 5A illustrates a block diagram of the exemplary data storage system of FIG. 3 showing the dynamic migration of disks into a RAID-4 configuration after one disk failure, in accordance with one embodiment of the present invention.

FIG. 5A in combination with flow chart 800 of FIG. 8 illustrates a block diagram of the exemplary data storage system 300 of FIG. 3 showing the dynamic migration of disks into a RAID-4 configuration after one disk failure, in accordance with one embodiment of the present invention. Upon failure of a single device, or array, due to a failed disk drive, the present embodiment merges two mirrored devices (e.g., 310 and 320) in step 820 to produce a single array of RAID-4 configuration, the new array 410. The new array 410 is comprised of two disk drives containing data and one disk drive containing redundancy data (2+1 RAID-4 array). The resulting data storage system 300 contains arrays 410, 330 and 340.

Device-1 320 in FIG. 5A has failed due to the failure of disk 322. As such, the information on disk 322, data block-1 and data block-5, does not have any redundancy. As illustrated in FIG. 5A and in step 820, mirrored device-0 310 is migrated or combined with the remaining operating disk drives of device-1 320. Since device-0 320 was a mirrored device, the only remaining disk drive that is operable is disk drive 325. The newly created array is labeled device-4 410 in FIG. 5A.

In order to provide redundancy for the newly created device-4 410, the disk drive 315 is arbitrarily chosen to contain the redundancy information for the device-4 410. Similarly, disk drive 312 could easily have been chosen. In disk drive 315, to provide redundancy, an XOR function is applied to the data contained in stripe unit-0 (block 0), and block-1. Similarly, in stripe unit-1, to provide redundancy, an XOR function is applied to the data contained in stripe unit-1 (block 4 and block 5) of disk drive 325.

The RAID 4 configuration is chosen for reconstruction simplicity. The reconstruction effort requires a minimum amount of steps in the present embodiment. The reconstruction effort is as follows: 1) reading the surviving block (e.g., block 1) with the corresponding mirrored block (e.g., block-0), 2) applying the XOR function to the data, and 3) replacing one of the mirrored blocks with the XOR result. In the present example, the disk drive 315 was selected to contain the redundancy data.

Figure 5B:
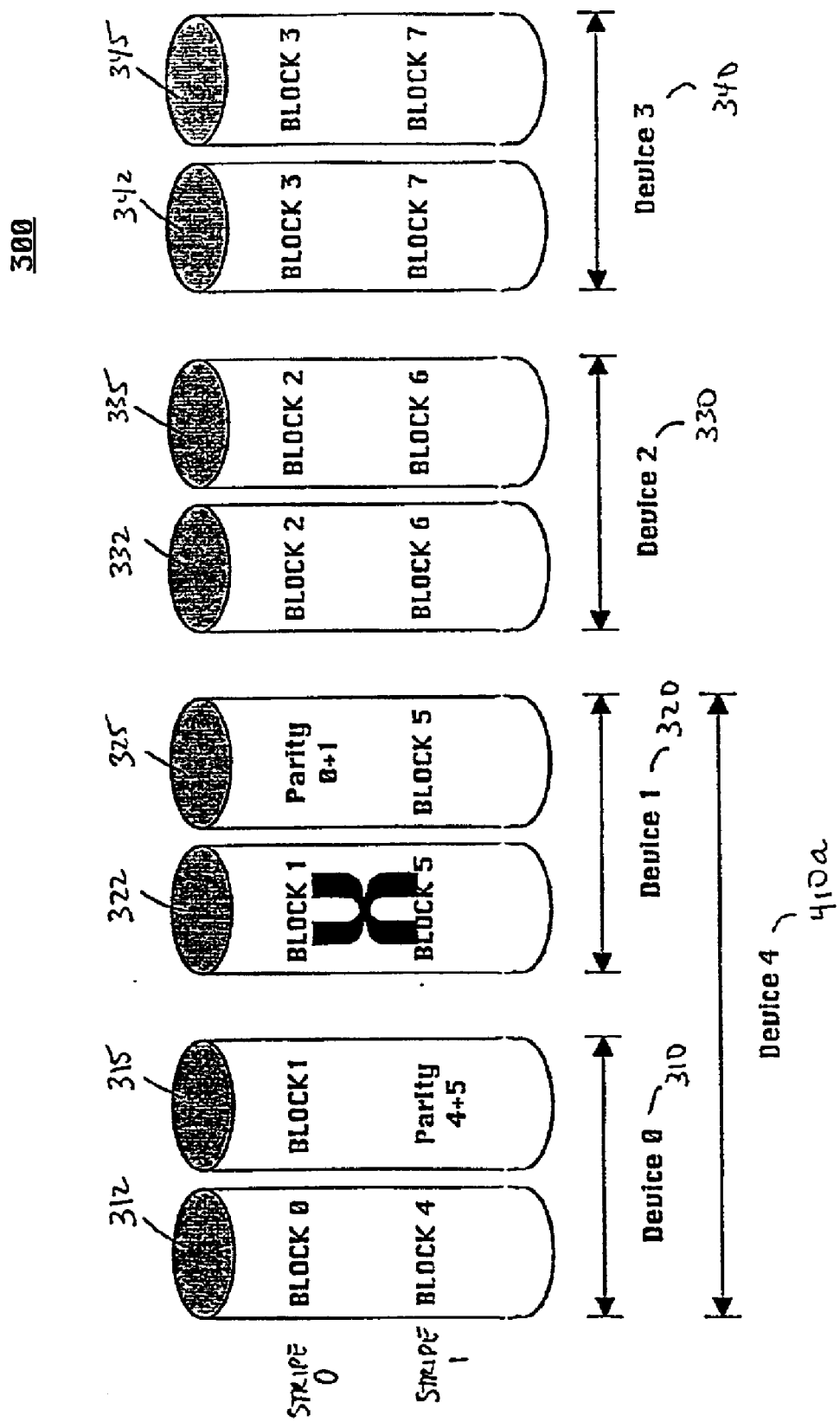
FIG. 5B illustrates a block diagram of the exemplary data storage system of FIG. 3 showing the dynamic migration of disks into a RAID-5 configuration after one disk failure, in accordance with one embodiment of the present invention.

FIG. 5B in combination with flow chart 800 illustrates a block diagram of the exemplary data storage system 300 of FIG. 3 showing the dynamic migration of disks into a RAID-5 configuration after one disk failure, in accordance with one embodiment of the present invention. Upon failure of a single device, or array, due to a failed disk drive, the present embodiment merges two mirrored devices (e.g., 310 and 320) in step 820 to produce a single array of RAID-5 configuration, the new array (410*a*). The new array 410*a* is comprised of two disk drives containing data and one disk drive containing redundancy data (2+1 RAID-5 array). The resulting data storage system 300 contains arrays 410*a*, 330 and 340.

Device-1 320 in FIG. 5B has failed due to the failure of disk drive 322. As such, the information on disk drive 322, data block-1 and data block-5, does not have any redundancy. As illustrated in FIG. 5B, mirrored device-0 310 in step 820 is dynamically migrated or combined with the remaining operating disk drive of device-1 320. Since device-0 320 was a mirrored device, the only remaining disk drive that is operable is disk drive 325. The newly created array is labeled device-4 410*a* in FIG. 5B.

In order to provide redundancy for the newly created device-4 410*a* in a RAID-5 configuration, the redundancy data must not be located on the same disk drive. As such, in strip unit-0, disk drive 325 of FIG. 5B could contain the redundancy data. This is accomplished by applying the XOR function to blocks 0 and 1 and writing it to disk 325. Correspondingly, data block-1 is simply read from disk 325 and written to disk 315 in stripe unit-0 of FIG. 5B. A similar procedure is performed to provide redundancy for the data contained in stripe unit-1, block 4 and block 5.

If a RAID-5 configuration is preferred as depicted in FIG. 5B, occasionally, the surviving blocks in the failed array (blocks 1 and 5 in disk 325) have to be copied in order to replace one of the mirrored blocks. This copying is accomplished before replacing the surviving block with the XOR result.

The RAID-5 configuration is also the recommended configuration for a data storage system that has seven disk drives, two of which are spare disk drives, in accordance with one embodiment of the present invention. In this case, during reconstruction of the data and redundancy, device-4 410*a* of FIG. 5B will be in a transitory state. Device-4 410*a* will have a book mark between the reconstructed area, the area currently under reconstruction and the area to be reconstructed. Each area will be accessed according to its RAID properties. Unlike the configuration in FIG. 3, only one half of the entire data is affected by the reconstruction effort.

Now referring back to FIGS. 5A and 5B, in combination with flow chart 800 of FIG. 8, a second failure in device-2 330 or device-3 340 will also result in a similar RAID-4/5 configuration between device-2 330 and device-3 340, in accordance with one embodiment of the present invention. In step 830, after failure of a second mirrored array in data storage system 300, due to a failed disk drive, the present embodiment merges two mirrored devices (e.g., 330 and 340) in step 830 to produce a single new array of RAID-4 or RAID-5 configuration. The new array is comprised of two disk drives containing data and one disk drive containing redundancy data (2+1 RAID-4/5 array). The resulting data storage system 300 would contain two (2+1 RAID-4 or RAID-5 arrays).

However, a second failure in device-4 410 of either FIG. 5A or 5B will result in migrating another mirrored device (e.g., device-2 330 or device-3 340) with device-4 410. The newly combined array, device-5 510, is configured into a RAID-4 or RAID-5 device. Device-5 510 will contain three disk drives containing data and one disk drive containing redundancy data for device-5 510.

Figure 6:
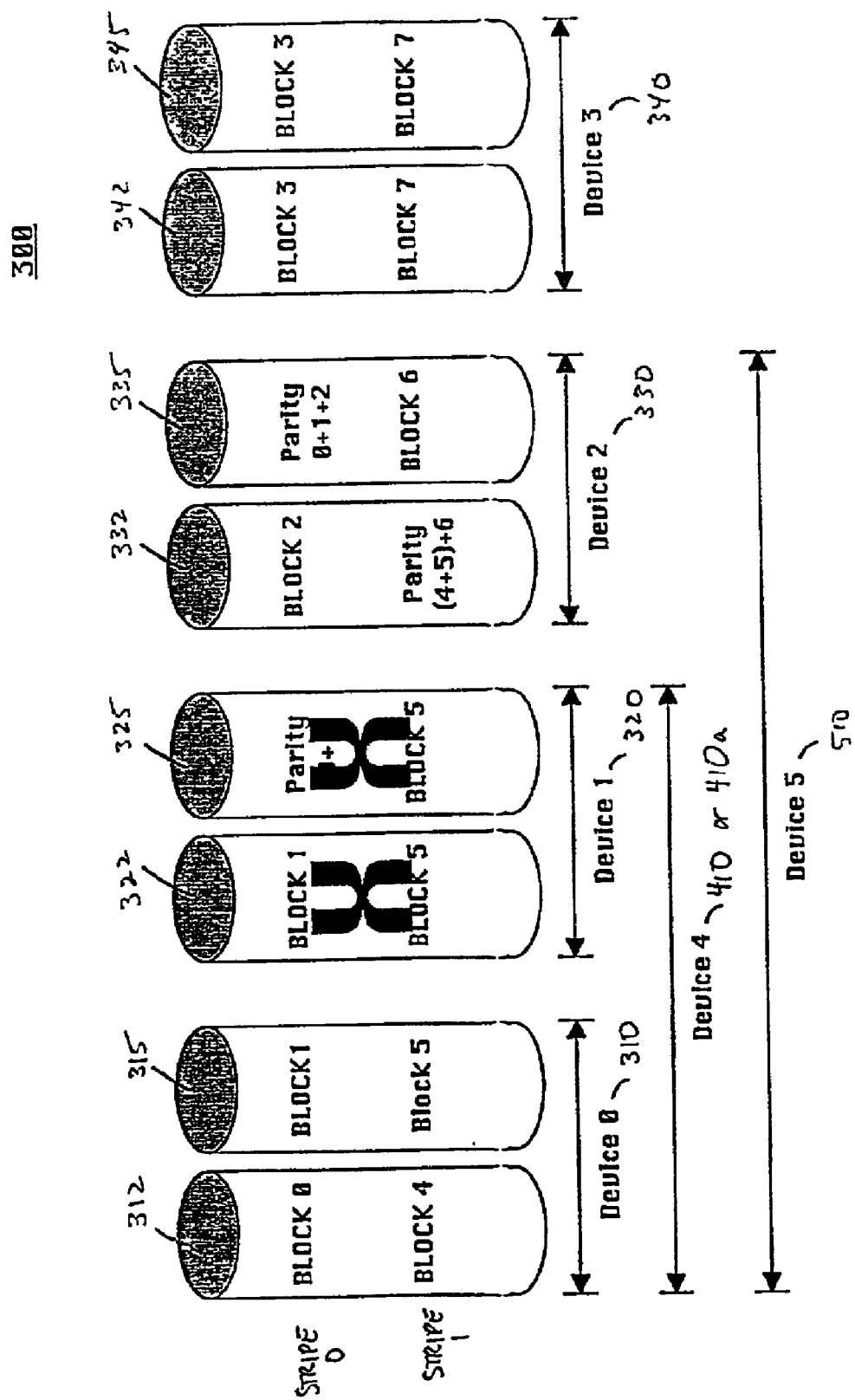
FIG. 6 illustrates a block diagram of the exemplary data storage system of FIG. 3 showing the dynamic migration of disks after two disk failures, in accordance with one embodiment of the present invention.

For example, FIG. 6 in combination with flow chart 800 illustrates a block diagram of the exemplary data storage system 300 of FIG. 3 showing the dynamic migration of disks into a RAID-5 configuration after two disk failures, in accordance with one embodiment of the present invention. For simplicity, the discussion in FIG. 6 involves the RAID-5 configuration of FIG. 5B; however, the present invention is also well suited to embodiments involving the RAID-4 configuration of FIG. 5A.

Device-4 410*a* in FIG. 6 has failed due to the failure of disk drive 325. As such, the information lost in the data storage system 300 due to the disk failure of disk drive 325 must be reconstructed. FIG. 6 shows that data block 5 has been lost and needs reconstruction. As illustrated in FIG. 6, the present embodiment merges mirrored device-2 330 with the remaining operating disk drives of device-4 410*a* in step 840 of flow chart 800. The newly created array is labeled device-5 510 in FIG. 6, and is comprised of disk drives, 312, 315, 332, and 335 (3+1 RAID-5). The resulting data storage system 300 contains a 3+1 RAID-5 array 510 and a mirrored pair array 340.

FIG. 6 shows device-5 510 in a RAID-5 configuration, in accordance with one embodiment of the present invention. However, device-5 510 could also be configured in a RAID-4 configuration to maximize performance depending on the I/O operations encountered by data storage system 300.

In order to provide redundancy for the newly created device-5 510 in a RAID-5 configuration, the redundancy data must not be located on the same disk drive. As such, in strip unit-0, disk drive 335 could contain the redundancy data. This is accomplished by applying the XOR function to blocks 0, 1, and 2 and writing it to disk 335.

For a RAID-5 configuration, some of the blocks may have to be reconstructed or copied in order to shift the redundancy data to other disk drives. For example, in FIG. 6, block 5 must be reconstructed through various operations, including XOR operations, before writing data block 5 to stripe unit-1 of disk 315. Also, the redundancy data must be constructed by applying the XOR function to blocks 4, 5, and 6 before writing the redundancy data to disk drive 332. It is appreciated that any number of different operations in other embodiments can achieve the same result in FIG. 6.

Now referring back to FIG. 6, in combination with flow chart 800 of FIG. 8, a third failure in device-5 510 result in a similar RAID-4/5 configuration, in accordance with one embodiment of the present invention. Upon failure of a disk drive in array 510, the present embodiment in step 850 merges the array 510 with the remaining mirrored array 340 to produce a single new array of RAID-4 or RAID-5 configuration. The new array is configured into a RAID device with four disk drives containing data and one disk drive containing redundancy data (4+1 RAID array). The newly created RAID device can be of a RAID-4 or RAID-5 configuration in order to maximize performance depending on the I/O operations encountered.

Similarly, referring back to FIG. 8, in the case where data storage system 300 contains two (2+1 RAID-4/5) devices each having 2 data disks and one redundancy, a failure in either of the 2+1 RAID arrays would result in a RAID-4/5 configuration, in accordance with one embodiment of the present invention. Upon failure of a disk drive in either of the aforementioned arrays, the present embodiment in step 850 merges the failed 2+1 RAID array with the remaining 2+1 RAID array to produce a single new array of RAID-4 or RAID-5 configuration. The new array is configured into a RAID device with four disk drives containing data and one disk drive containing redundancy data (4+1 RAID array). The newly created RAID device can be of a RAID-4 or RAID-5 configuration in order to maximize performance depending on the I/O operations encountered.

Additionally, as discussed previously, the methods outlined in flow charts 700, 750, and 800 can be applied for continued failures after utilizing all the spare disks that are configured in an array of mirrored pairs of disk drives. After failure of a disk drive in any array, a second array having redundancy with the least number of disk drives is selected, as described previously in step 722 of flow chart 750. The second array is combined with the failed array containing the failed disk drive to create a larger fault-resilient array that has lesser redundancy.

Although the write operations may not be as efficient as a new array containing three disk drives (three accesses vs. four accesses), there still is a graceful reduction of performance degradation of the data storage system from disk failure, partly due to the continued distribution of data throughout smaller arrays. Smaller arrays provide wider distribution of reduction data, less processing time, and increased access to data. Up to the last device failure, the performance and data availability benefits of the simpler and smaller RAID devices are maintained and preserved. Thus, the present embodiment promotes the most efficient data storage system to be dynamically created after failure of a disk drive.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, microcontrollers, optical computers, analog computers, dedicated processors and/or dedicated hard wired logic may be used to construct alternative equivalent embodiments of the present invention.

Those skilled in the art will appreciate that the program steps used to implement the embodiments described above can be implemented using disc storage as well as other forms of storage including Read Only Memory (ROM) devices, Random access Memory (RAM) devices; optical storage elements, magnetic storage elements, magneto-optimal storage elements, flash memory, core memory and/or other equivalent storage technologies without departing from the present invention. Such alternative storage devices should be considered equivalents.

While the methods of embodiments illustrated in flow chart 700, 750 and 800 show specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

Embodiments of the present invention, leveraging spares in a data storage system for providing recovery and redundancy after disk failure, is thus described. While the present invention has been described in particular embodiments, it should be appreciated that the present invention should not be construed as limited by such embodiments, but rather construed according to the below claims.

What is claimed is:

1. A method for data redundancy in a data storage system, comprising:
   a) grouping a plurality of disk drives into a plurality of arrays having data redundancy to optimize performance, and
   b) for every failure of one of said plurality of arrays due to a failed disk drive, dynamically creating a new array having data redundancy in said plurality of arrays and that is optimized for performance, said new array containing information from said failed disk drive: wherein b) comprises:
      b1) upon failure of a first array in said plurality of arrays due to said first failed disk drive, dynamically choosing a second array in said plurality of arrays that has the smallest number of disk drives as between the remaining arrays, said second array having redundancy;
      b2) combining disk drives from said first array, excluding said first failed disk drive, with disk drives from said second array to dynamically form said new array in a RAID configuration having data redundancy in said plurality of arrays; and
   configuring said new array in a RAID-4 configuration.

2. A method for data redundancy in a data storage system, comprising:
   a) grouping a plurality of disk drives into a plurality of arrays having data redundancy to optimize performance, and
   b) for every failure of one of said plurality of arrays due to a failed disk drive, dynamically creating a new array having data redundancy in said plurality of arrays and that is optimized for performance, said new array containing information from said failed disk drive; wherein b) comprises:
      b1) upon failure of a first array in said plurality of arrays due to said first failed disk drive, dynamically choosing a second array in said plurality of arrays that has the smallest number of disk drives as between the remaining arrays, said second array having redundancy;
      b2) combining disk drives from said first array, excluding said first failed disk drive, with disk drives from said second array to dynamically form said new array in a RAID configuration having data redundancy in said plurality of arrays; and
   configuring said new array in a RAID 5 configuration.

3. A method for data redundancy in a data storage system, comprising:
   a) grouping a plurality of disk drives into a plurality of arrays having data redundancy to optimize performance, including a first and second array;
   b) upon failure of said first array due to a first failed disk drive, dynamically combining disk drives from said first array, excluding said first failed disk drive, with disk drives from said second array to form a first new array having data redundancy in said plurality of arrays; wherein b) comprises
      b1) if a first mirrored pair is available, choosing said first mirrored pair to be said second array;
      b2) if no arrays of mirrored pairs of disk drives are present in said plurality of arrays, choosing an array having redundancy that has the next smallest number of disk drives to be said second array; and
      b3) combining disk drives from said first array with disk drives from said second array to form said first new array in a RAID configuration having data redundancy in said plurality of arrays.

4. A method for data redundancy in a data storage system, comprising:
   a) grouping a plurality of disk drives into a plurality of arrays having data redundancy to optimize performance, including a first and second array;
   b) upon failure of said first array due to a first failed disk drive, dynamically combining disk drives from said first array, excluding said first failed disk drive, with disk drives from said second array to form a first new array having data redundancy in said plurality of arrays;
   c) upon failure of said first new array due to a second failed disk drive, if a first minored pair is available, choosing said mirrored pair to be a third array in said plurality of arrays;
   d) if no arrays of mirrored pairs of disk drives are present, choosing an array having redundancy that has the smallest number of disk drives to be said third array; and
   e) upon failure of said first new array, combining disk drives from said first new array, not including said second failed disk drive, with disk drives from said third array, to form a second new array in a RAID configuration having data redundancy in said plurality of arrays.

5. The method for data redundancy as described in claim 4, further comprising:

f) upon failure of said second new array due to a third failed disk drive, if a second mirrored pair is available, choosing said second mirrored pair to be a fourth array in said plurality of arrays;

g) if no arrays of mirrored pairs of disk drives are present, choosing an array having redundancy that has the smallest number of disk drives to be said fourth array; and h) combining disk drives from said second new array, not including said third failed disk drive, with disk drives from said fourth array, to form a third new array in a RAID configuration having data redundancy in said plurality of arrays.

6. A method for data redundancy in a data storage system, comprising:

a) grouping a plurality of disk drives into a plurality of arrays having data redundancy to optimize performance, including a first and second array;

b) upon failure of said first array due to a first failed disk drive, dynamically combining disk drives from said first array, excluding said first failed disk drive, with disk drives from said second array to form a first new array having data redundancy in said plurality of arrays;

c) upon failure of a third array due to a second failed disk drive, if a first mirrored pair is available, choosing said first mirrored pair to be a fourth array in said plurality of arrays;

d) if no arrays or mirrored pairs of disk drives are present, choosing an array having redundancy that has the smallest number of disk drives to be said fourth array; and e) dynamically combining disk drives from said third array, not including said second failed disk drive, with disk drives from said fourth array to form a second new array in a RAID configuration having data redundancy in said plurality of arrays.

7. A data storage system comprising:

a plurality of disk drives comprising spare disks; and an array controller comprising a processor, and a memory wherein said memory contains instructions that when executed implement a method comprising:

a) grouping a plurality of disk drives into a plurality of arrays having data redundancy to optimize performance, and b) for every failure of one of said plurality of arrays due to a failed disk drive, dynamically creating a new array having data redundancy in said plurality of arrays and that is optimized for performance, said new array containing information from said failed disk drive; wherein b) comprises:

b1 upon failure of a first array in said plurality of arrays due to said first failed disk drive, dynamically choosing a second array in said plurality of arrays that has the smallest number of disk drives as between the remaining arrays, said second array having redundancy;

b2) combining disk drives from said first array, excluding said first failed disk drive, with disk drives from said second array to dynamically form said new array in a RAID configuration having data redundancy in said plurality of arrays; and configuring said new array in a RAID-4 configuration.

8. A data storage system, comprising:

a plurality of disk drives comprising spare disks; and an array controller comprising a processor, and a memory wherein said memory contains instructions that when executed implement a method comprising:

a) grouping a plurality of disk drives into a plurality of arrays having data redundancy to optimize performance, and b) for every failure of one of said plurality of arrays due to a failed disk drive, dynamically creating a new array having data redundancy in said plurality of arrays and that is optimized for performance, said new array containing information from said failed disk drive; wherein b) comprises:

b1) upon failure of a first array in said plurality of arrays due to said first failed disk drive, dynamically choosing a second array in said plurality of arrays that has the smallest number of disk drives as between the remaining arrays, said second array having redundancy;

b2) combining disk drives from said first array, excluding said first failed disk drive, with disk drives from said second array to dynamically form said new array in a RAID configuration having data redundancy in said plurality of arrays; and configuring said new array in a RAID-5 configuration.

9. A method, comprising:

grouping a plurality of disk drives into a plurality of arrays, each comprising a plurality of disk drives, and each array providing data redundancy within the respective array;

detecting a failure of a disk drive in one array of the plurality of arrays; and in response to said detecting a failure, combining said one array with another array of the plurality of arrays into a new array comprising all non-failed disk drives of the two combined arrays.

10. The method of claim 9, wherein said another array comprises the smallest number of disk drives of any of the plurality of arrays, excepting said one array in which a failure was detected.

11. The method of claim 9, wherein said combining comprises configuring the new array as a RAID device.

12. The method of claim 11, wherein the RAID device is a RAID-4 device.

13. The method of claim 11, wherein the RAID device is a RAID-5 device.

14. The method of claim 9, wherein said grouping comprises maximizing the number of arrays of the plurality of arrays that comprise mirrored pairs of disk drives.

15. The method of claim 9, wherein said grouping comprises maximizing the number of arrays of the plurality of arrays that are configured as RAID devices including three disk drives.

16. The method of claim 9, wherein said grouping comprises a combination of at least two of: arrays of mirrored pairs of disk drives, arrays in a RAID configuration of three disk drives and arrays in a RAID configuration having more than three disk drives.

17. The method of claim 9, wherein said combined arrays both comprised mirrored pairs of disk drives prior to said combining, and wherein said new array is configured as a RAID device.

18. The method of claim 9, wherein said one array comprises a mirrored pair of disk drives, wherein said another array is configured as a RAID device, and wherein the new array is configured as a RAID device.

19. A system, comprising:

a plurality of disk drives; and an array controller, wherein the array controller comprises:

a processor; and a memory coupled to the processor, wherein the memory comprises program instructions configured to implement:

grouping the plurality of disk drives into a plurality of arrays, each comprising a plurality of disk drives, and each array providing data redundancy within the respective array;

detecting a failure of a disk drive in one array of the plurality of arrays; and in response to said detecting a failure, combining said one array with another array of the plurality of arrays into a new array comprising all non-failed disk drives of the two combined arrays.

20. The system of claim 19, wherein said another array comprises the smallest number of disk drives of any of the plurality of arrays, excepting said one array in which a failure was detected.

21. The system of claim 19, wherein as part of said combining, the program instructions are configured to configure the new array as a RAID device.

22. The system of claim 21, wherein the RAID device is a RAID-4 device.

23. The system of claim 21, wherein the RAID device is a RAID-5 device.

24. The system of claim 19, wherein as part of said grouping, the program instructions are configured to maximize the number of arrays of the plurality of arrays that comprise mirrored pairs of disk drives.

25. The system of claim 19, wherein as part of said grouping, the program instructions are configured to maximize the number of arrays of the plurality of arrays that are configured as RAID devices including three disk drives.

26. The system of claim 19, wherein as part of said grouping, the program instructions are configured to include in the plurality of arrays at least two of: arrays of mirrored pairs of disk drives, arrays in a RAID configuration of three disk drives and arrays in a RAID configuration having more than three disk drives.

27. The system of claim 19, wherein said combined arrays both comprise mirrored pairs of disk drives, and wherein the new array is configured as a RAID device.

28. The system of claim 19, wherein said one array comprises a mirrored pair of disk drives, wherein said another array is configured as a RAID device, and wherein the new array is configured as a RAID device.

29. A computer accessible medium comprising program instructions configured to implement:

grouping a plurality of disk drives into a plurality of arrays, each comprising a plurality of disk drives, and each array providing data redundancy within the respective array;

detecting a failure of a disk drive in one array of the plurality of arrays; and in response to said detecting a failure, combining said one array with another array of the plurality of arrays into a new array comprising all non-failed disk drives of the two combined arrays.

30. The computer accessible medium of claim 29, wherein said another array comprises the smallest number of disk drives of any of the plurality of arrays, excepting said one array in which a failure was detected.

31. The computer accessible medium of claim 29, wherein said combining comprises configuring the new array as a RAID device.

32. The computer accessible medium of claim 31, wherein the RAID device is a RAID-4 device.

33. The computer accessible medium of claim 31, wherein the RAID device is a RAID-5 device.

34. The computer accessible medium of claim 29, wherein as part of said grouping, the program instructions are configured to implement maximizing the number of arrays of the plurality of arrays that comprise mirrored pairs of disk drives.

35. The computer accessible medium of claim 29, wherein as part of said grouping, the program instructions are configured to implement maximizing the number of arrays of the plurality of arrays that are configured as RAID devices including three disk drives.

36. The computer accessible medium of claim 29, wherein as part of said grouping, the program instructions are configured to implement including in the plurality of arrays at least two of: arrays of mirrored pairs of disk drives, arrays in a RAID configuration of three disk drives and arrays in a RAID configuration having more than three disk drives.

37. The computer accessible medium of claim 29, wherein said combined arrays both comprise mirrored pairs of disk drives, and wherein the new array is configured as a RAID device.

38. The computer accessible medium of claim 29, wherein said one array comprises a mirrored pair of disk drives, wherein said another array is configured as a RAID device, and wherein the new array is configured as a RAID device.

* * * * *